(12) United States Patent
Goel et al.

(10) Patent No.: US 8,959,613 B2
(45) Date of Patent: Feb. 17, 2015

(54) SYSTEM AND METHOD FOR MANAGING ACCESS TO A PLURALITY OF SERVERS IN AN ORGANIZATION

(75) Inventors: Varun Goel, Diamond Bar, CA (US); Robert Walsh, Foster City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 842 days.

(21) Appl. No.: 12/487,380

(22) Filed: Jun. 18, 2009

(65) Prior Publication Data

US 2010/0325717 A1    Dec. 23, 2010

(51) Int. Cl.
  *G06F 9/00*  (2006.01)
  *H04L 29/06*  (2006.01)
(52) U.S. Cl.
  CPC ..................... *H04L 63/102* (2013.01)
  USPC .......................................................... 726/14
(58) Field of Classification Search
  CPC ... H04L 29/06; H04L 29/06755; H04L 63/00; H04L 9/002; H04L 9/32; H04L 63/102; G06F 21/00; G06F 21/30
  USPC ........................................................ 726/11, 2
  See application file for complete search history.

(56) References Cited

U.S. PATENT DOCUMENTS

| | | | |
|---|---|---|---|
| 6,851,113 B2 | 2/2005 | Hemsath | |
| 7,325,140 B2* | 1/2008 | Carley | 713/182 |
| 7,523,484 B2* | 4/2009 | Lum et al. | 726/1 |
| 7,870,601 B2* | 1/2011 | Pandey et al. | 726/2 |
| 8,135,657 B2* | 3/2012 | Kapoor et al. | 706/45 |
| 8,136,165 B2* | 3/2012 | Takala et al. | 726/27 |
| 2003/0217283 A1* | 11/2003 | Hrastar et al. | 713/200 |
| 2007/0220589 A1* | 9/2007 | Salowey et al. | 726/2 |
| 2010/0325685 A1* | 12/2010 | Sanbower | 726/1 |

OTHER PUBLICATIONS

Ylonen & Lonvick, "The Secure Shell (SSH) Protocol Architecture", Request for Comments: 4251, SSH Communications Security Corp & Cisco Systems, Inc. (2006), 21 pages. http://www.ietf.org/rfc/rfc4251.txt.
Ylonen & Lonvick, "The Secure Shell (SSH) Authentication Protocol", Request for Comments: 4252, SSH Communications Security Corp & Cisco Systems, Inc. (Jan. 2006), 12 pages. http://www.ietf.org/rfc/rfc4252.txt.

(Continued)

*Primary Examiner* — Tamara T Kyle
(74) *Attorney, Agent, or Firm* — Kilpatrick Townsend & Stockton LLP (57) ABSTRACT

A system for managing access to resources in a plurality of servers by a plurality of client computers by using an operating system independent Secure Shell (SSH) protocol running in each server and using a central policy database that centrally stores access rules which specify access to the servers for a plurality of users/accounts. Each time a target server receives a user request to establish an SSH session, it retrieves associated access rules from the central policy database to obtain the latest access rules. Based on the retrieved rules and the identity of the user and the identity of the client computer, the target server determines whether the user has permission to establish the SSH session with the target server. Using a centralized database and requiring the servers to always retrieve the latest access rules from a central database provides consistent application of the access rules across all servers and all client computers.

15 Claims, 9 Drawing Sheets

(56) References Cited

OTHER PUBLICATIONS

Ylonen & Lonvick, "The Secure Shell (SSH) Transport Layer Protocol", Request for Comments: 4253, SSH Communications Security Corp & Cisco Systems, Inc. (Jan. 2006) http://www.ietf.org/rfc/rfc4253.txt.

Ylonen & Lonvick, "The Secure Shell (SSH) Connection Protocol", Request for Comments: 4254, SSH Communications Security Corp & Cisco Systems, Inc. (Jan. 2006), 23 pages. http://www.ietf.org/rfc/rfc4254.txt.

Configuring OpenSSH for Kerberos-Based Authentication to Linux & UNIX, downloaded Aug. 14, 2014, 3 pages. http://www.centrify.com/resources/openssh.asp#learn_more.

"Open SSHK—Keeping your Communiques Secret", OpenSSH released Mar. 16, 2014, downloaded Aug. 14, 2014, 1 page. http://www.openssh.com/.

"OpenSSH—Project Goals", downloaded Aug. 14, 2014, 2 pages. http://www.openssh.com/goals.html.

"OpenSSH—Specifications Implemented by Open SSH", downloaded Aug. 14, 2014 http://www.openssh.com/specs.html.

"Tectia SSH Client & Server Datasheet", SSH, downloaded Aug. 14, 2014, 1 page. http://www.ssh.com/resources/datasheets/6-tectia-ssh-client-server-datasheet.

"The Foundation of a Robust Secure Shell Infrastructure", Data Sheet, Tactia® SSH Client, Tactia ® SSH Server, SSH Securing the path to your information assets, (2014) 2 pages http://pages.ssh.com/rs/ssh/images/Datasheet-Tectia%20SSH%20Client%20%26%20Server.pdf.

* cited by examiner

SYSTEM AND METHOD FOR MANAGING ACCESS TO A PLURALITY OF SERVERS IN AN ORGANIZATION

FIELD OF THE INVENTION

The present invention relates to access management systems, and more particularly to a system and method for managing access to a plurality of servers in an organization.

BACKGROUND OF THE INVENTION

Figure 1A:
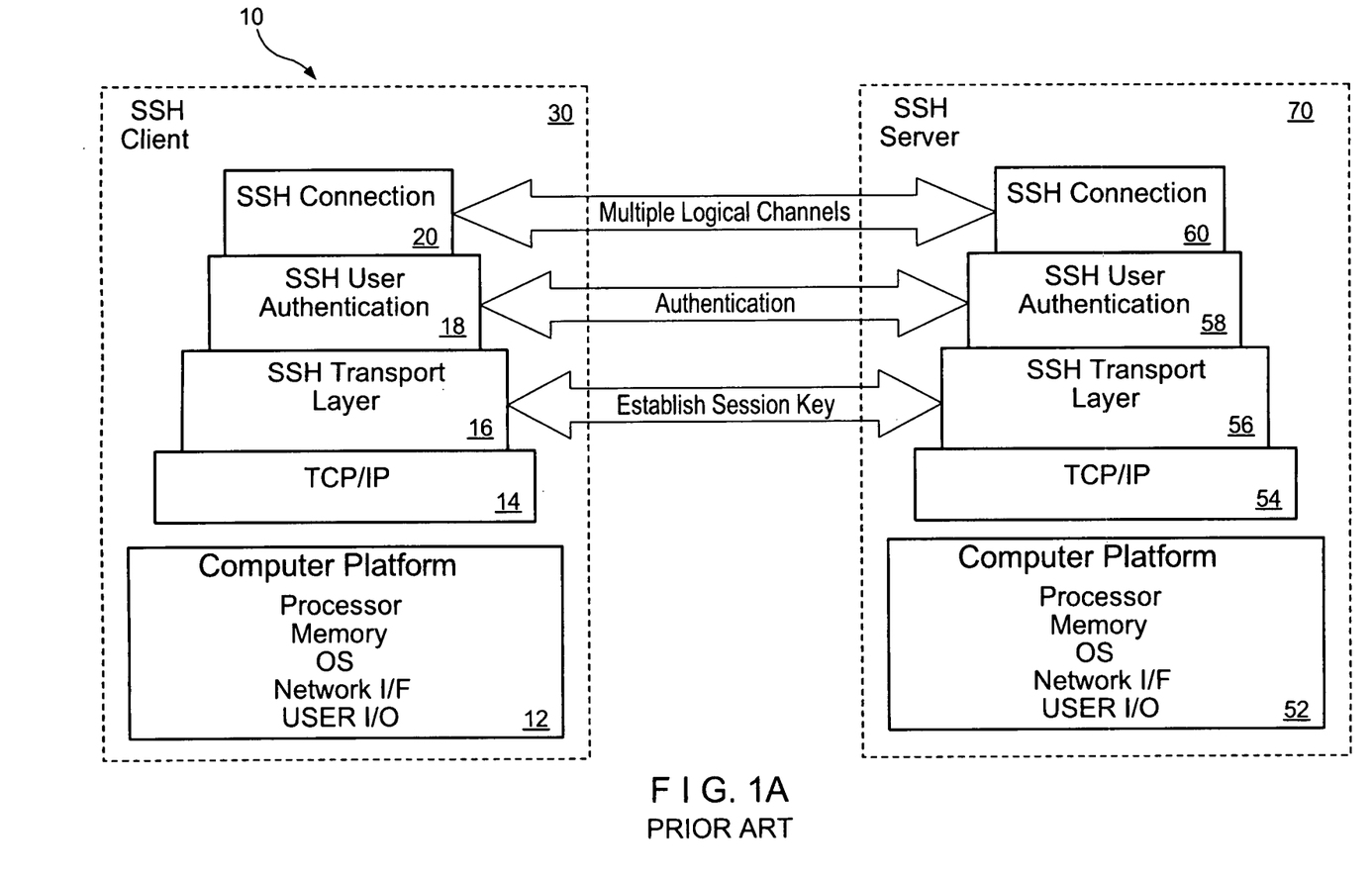
FIG. 1A is a block diagram of a portion of the OSI model depicting an SSH protocol stack of the prior art.

The Secure Shell (SSH) protocol allows client computers to connect with servers to perform services such as remote login, file transfer, file copy and other secure network services over an insecure network such as the Internet. With an SSH connection, passwords are encrypted so that account and group authentication credentials are protected. FIG. 1A is a block diagram of a portion of the Open Systems Interconnection (OSI) model established by the International standards organization (ISO) depicting layers involved in a conventional SSH establishment process. The SSH protocol 10 is employed to establish a secure remote login between a client 30 and a server 70. The client 30 includes a computer platform 12 having a transmission control protocol/Internet protocol ("TCP/IP") connection 14, or other comparable data stream connection. Correspondingly, the server 70 includes a computer platform 52 having a TCP/IP connection 54.

In general, the SSH protocol 10 securely connects client 30 and server 70 by establishing a session key between transport layers 16, 56 of the client and server, respectively. The transport layer protocol provides server authentication, confidentiality, and integrity. Once the session key is established, a user authentication protocol authenticates the client user authentication layer 18 to the server authentication layer 58. The user authentication protocol supports various encryption methodologies, including public key, password and host-based client methods. An encrypted tunnel is then multiplexed between the client connection layer 20 and the server connection layer 60.

The SSH protocol, which is described by various Internet drafts from the (IETF), including "SSH Protocol Architecture," "SSH Transport Layer Protocol," "SSH Authentication Protocol," and "SSH Connection Protocol." These documents are Ylonen, T. and C. Lonvick, Ed., "The Secure Shell (SSH) Protocol Architecture", RFC 4251, January 2006, and Ylonen, T. and C. Lonvick, Ed., "The Secure Shell (SSH) Transport Layer Protocol", RFC 4253, January 2006, Ylonen, T. and C. Lonvick, Ed., "The Secure Shell (SSH) Authentication Protocol", RFC 4252, January 2006, and Ylonen, T. and C. Lonvick, Ed., "The Secure Shell (SSH) Connection Protocol", RFC 4254, January 2006, all of which are incorporated by reference herein. While these drafts provide various standards for the SSH protocol, there is no definitive security policy established that sets forth procedures by which a server, presented with a request by a client computer to establish an authenticated and protected tunnel over which to run an SSH service, authorizes such a request. This has resulted in substantial management obstacles for enterprises that require employees, consultants and/or vendors to access network resources using an SSH connection. Conventionally, implementers must maintain, at each server, authorization policies for individual clients and accounts, i.e., users and applications.

In addition, SSH providers include various vendors and/or open source entities. The multiplicity of providers generally results in implementation of diverse authorization protocols.

One known authorization protocol allows a user, once authenticated, to use all resources available through the SSH connection. This clearly presents security problems in enterprises where different accounts are provided for access to specified network information.

A common approach to existing SSH security policy management and enforcement is the implementation of configuration files at each server using the SSH daemon, i.e., a server-centric approach. One attempt to enhance security policies with respect to an individual server operating in an SSH protocol is described in Hemsath U.S. Pat. No. 6,851,113, assigned to IBM, and which is incorporated by reference herein. In the Hemsath patent, an extension is provided on an SSH server whereby a set of user credentials are created, and the credentials are associated with a session key. While Hemsath states that a policy database of allowed users and permissions is preferably maintained in a centralized location for ease of administration, this is referring only to a centralized user registry on the particular server. However, Hemsath is not in any way concerned with problems that arise when several target servers operating in the SSH protocol are to be administered.

Figure 1B:
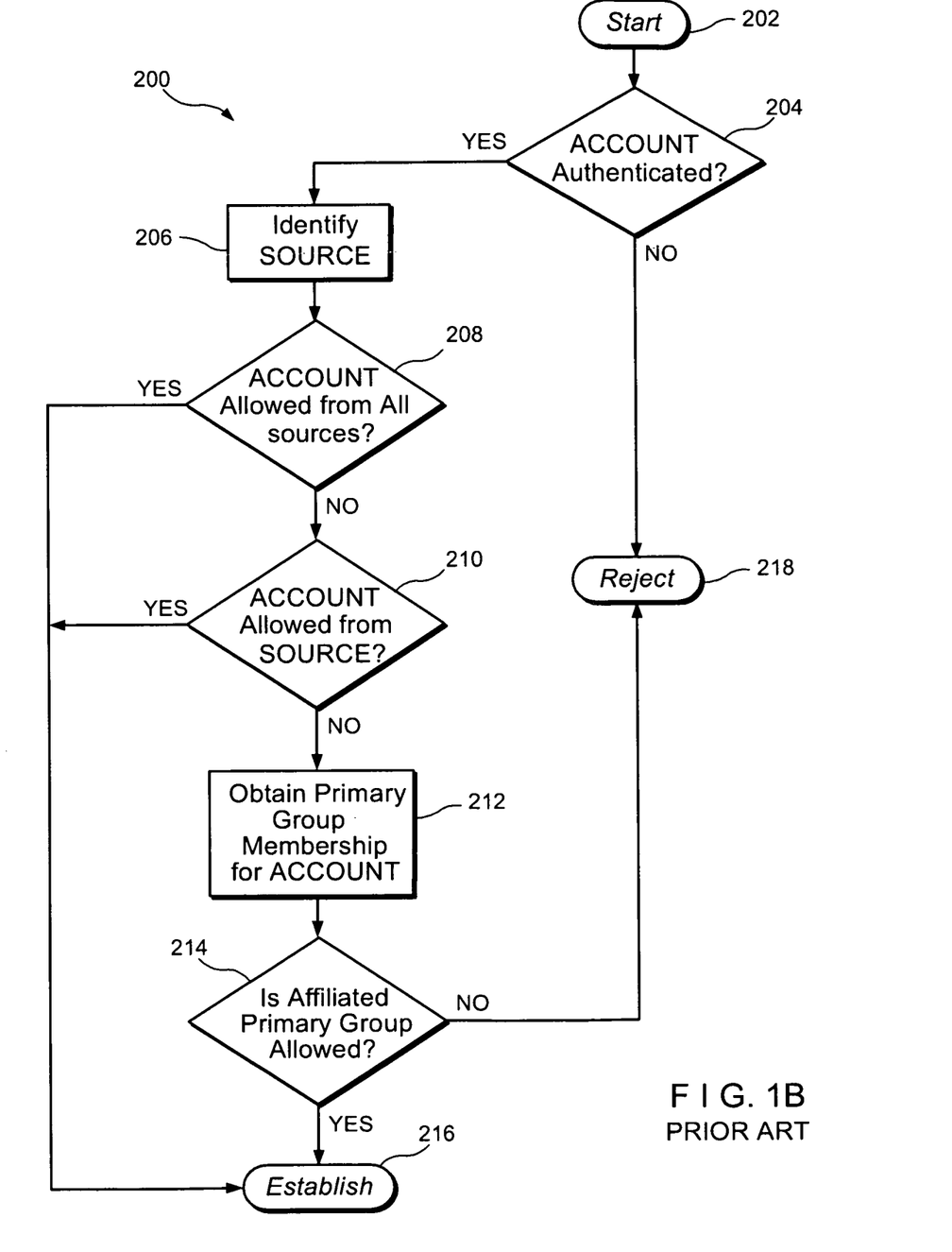
FIG. 1B is a process flow diagram of account authentication of an account to an SSH server on a server-centric level according to the prior art.

FIG. 1B is a flow diagram of an account authorization process on a server-centric level according to the prior art. The process starts 202 after the SSH session key has been established between the transport layers of the client computer and the server. This protects account information transmitted over the connection, including account names and passwords. The first decision step 204 queries the server as to whether the account is authenticated according to the existing authentication protocol of the SSH standards. If the account is not authenticated, then the establishment of the requested SSH tunnel is rejected 218.

If the account is authenticated, the process then proceeds to a series of steps to authorize the user based on a server-centric user registry or configuration file. A processing step 206 is invoked, in which the source, i.e., client computer, is identified. The next decision step 208 determines whether the account is allowed. In conventional SSH authorization protocols, this step generally assumes that the account is allowed to access the target server from any source computer unless a particular source is specified. If the decision at step 208 is affirmative, i.e., the account does not specify a particular source computer, then the SSH session is established 216.

If the decision at step 208 is negative, then the next decision step 210 determines whether the account access is permitted from the particular source based upon consultation with the server-centric user registry. If the decision at step 210 is affirmative, then the SSH session is established 216.

If the decision at step 210 is negative, the process flow proceeds to a primary group identification step 212, in which the primary group membership for the user is obtained. The primary group membership is used to determine at decision step 214 whether the identified group is allowed based on group permission retained in the user registry stored in the target server. If the decision 214 is affirmative, then the SSH session is established 216 without restriction based on the source identity. If the decision at step 214 is negative, establishment of the SSH session is rejected 218.

While a server-centric policy management system generally following the authorization process described with respect to FIG. 1B can be acceptable for systems with one server operating the SSH protocol, it has been found that relying upon individual server administration policies in organizations operating a plurality of servers is rather cumbersome. Many enterprises operate several hundred, or more, servers, with resources accessed from many thousands of client computers. Configuration files containing specific policies must be specified or replicated at each server, requiring updates on a regular basis and/or when accounts are changes. This is difficult, if not impossible, to implement on a real time basis, and hence the likelihood of error is increased.

Further, by using server-centric security administration policies, each server itself is a so-called "weak link" that can be compromised. If a particular server having the configuration files is compromised, an intruder could not only access data at that server, but could also modify the configuration file and/or the user registry thereby facilitating future intrusions.

Active Directory is a directory service component to Windows® server platforms, and provides the means to manage the identities and relationships within and among Windows® servers. However, many servers employ operating systems other than Windows®, such as UNIX or Linux operating systems. The Active Directory identity management tools are not compatible with operating systems other than Windows®. A key disadvantage of this limitation is that the Active Directory identity management tools will only work within a homogenous Windows® operating system environment.

It would, therefore, be desirable to have an access management system for managing access by client computers to servers which is independent of the operating system being run in each server, which reduces the conflicting access policies in different servers and which increases the security of the access policies.

SUMMARY OF THE DISCLOSURE

The present invention provides a system for managing access to a plurality of servers each executing an operating system independent Secure Shell (SSH) protocol. A central policy database stores access rules that specify access to the servers for a plurality of users or accounts. The servers of the system each include an access control module. The access control module is adapted to receive from a client computer a user request to establish an SSH session with a target server. When the request is received, the access control module retrieves the access rules for the user from the central policy database, and determines whether the user has permission to establish the SSH session with the target server based on the retrieved access rules.

DETAILED DESCRIPTION OF THE INVENTION

Figure 2:
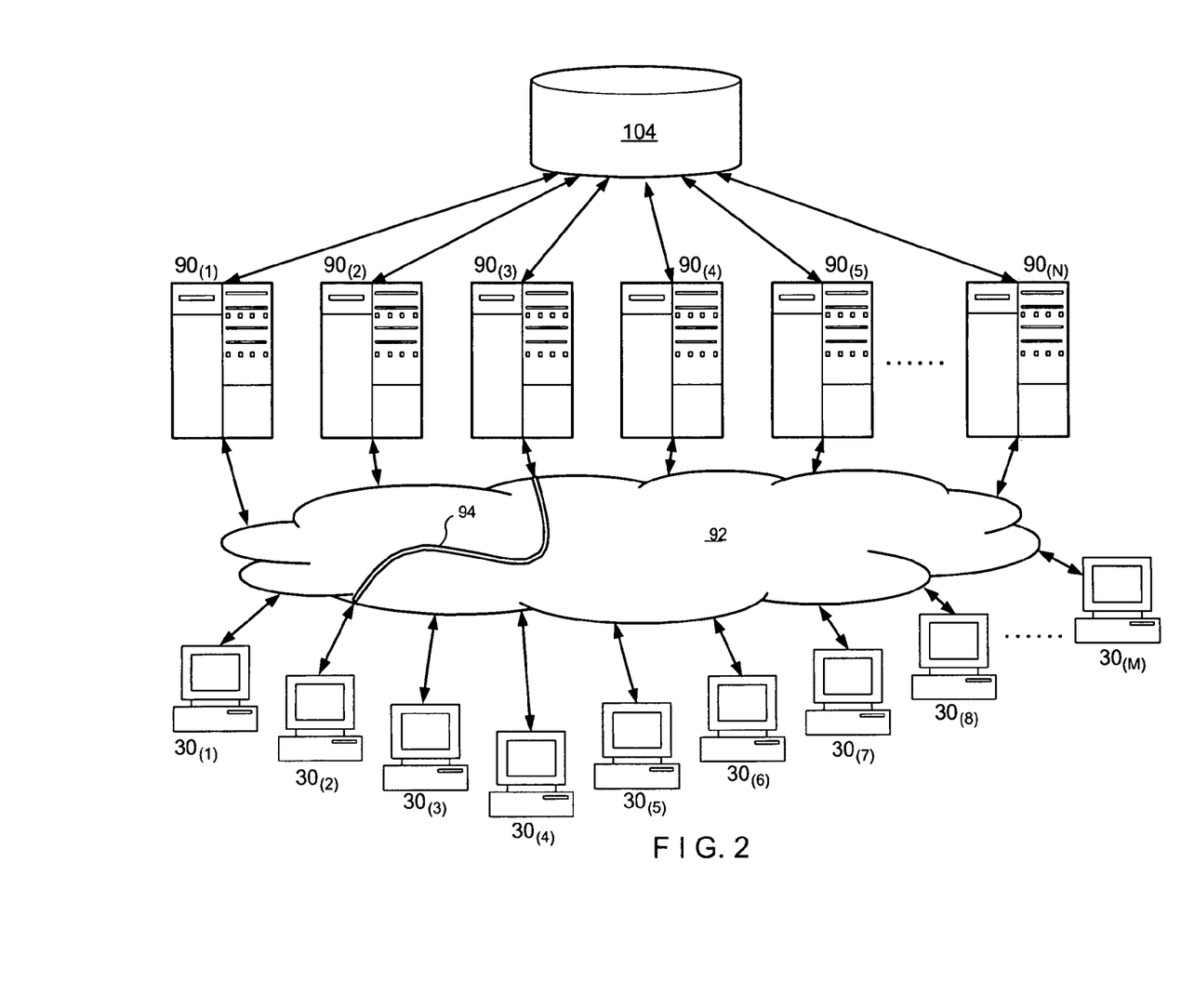
FIG. 2 is a schematic of an enterprise network operating the SSH protocol according to an embodiment of the present invention.
Figure 3:
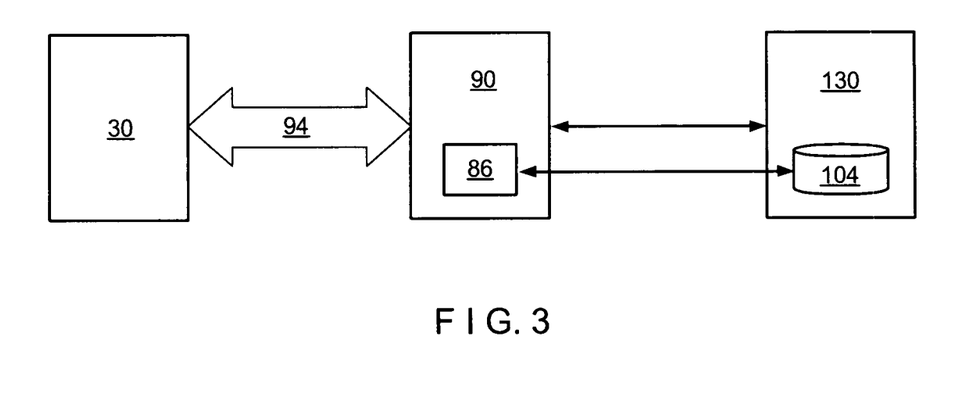
FIG. 3 is a block diagram of a system for managing SSH establishment according to an embodiment of the present invention

According to the present invention, and referring to FIGS. 2 and 3, an SSH session request by an account from a particular source computer to access certain resources on a given target server is accomplished by consulting a central policy database 104 including a set of attributes for each allowed account. The central policy database 104 generally resides in memory of an attribute management computer 130, and is linked with a plurality of target SSH servers 90, denoted $90_{(1)}$, $90_{(2)}$, $90_{(3)}$, $90_{(4)}$, $90_{(5)}$ ... $90_{(N)}$. The attribute management computer 130 stores and provides access to the central policy database 104 for creation, modification and management.

These target servers are connected to a common network 92, which can be an unsecured network such as the Internet or another wide area network, or a secured or unsecured network such as one or more intranets, extranets, local area networks, campus area networks, metropolitan area networks, or other local area network. A plurality of SSH enabled client computers 30, denoted $30_{(1)}$, $30_{(2)}$, $30_{(3)}$, $30_{(4)}$, $30_{(5)}$, $30_{(6)}$, $30_{(7)}$, $30_{(8)}$ ... $30_{(M)}$, are also connected to the network 92. The various servers and client computers operate in the SSH protocol independent of the operating system, and can include a heterogeneous network with servers based on various operating systems such as UNIX®, Linux, Windows NT or the like, and client computers based on Windows, UNIX, MAC OS, Linux or the like. According to the present invention, an authenticated, protected tunnel 94 is provided for the operation system-independent SSH connection protocol between one of the client computers 30 and one of the target servers 90 based on account attributes maintained in the central policy database 104.

In particular, an access control module 86 is provided at each target server 90. In the embodiment shown, the access control module 86 is part of the generally available SSH code which has been modified to retrieve the access rules from a central location, rather than from within the server. In particular, the access control module 86 is executable to retrieve access rules in the central policy database 104 to determine whether an account, requesting establishment of an SSH session to access certain resources on a target server with an SSH service from a particular client computer 30, has the requisite permissions with respect to the target server 90.

Figure 4:
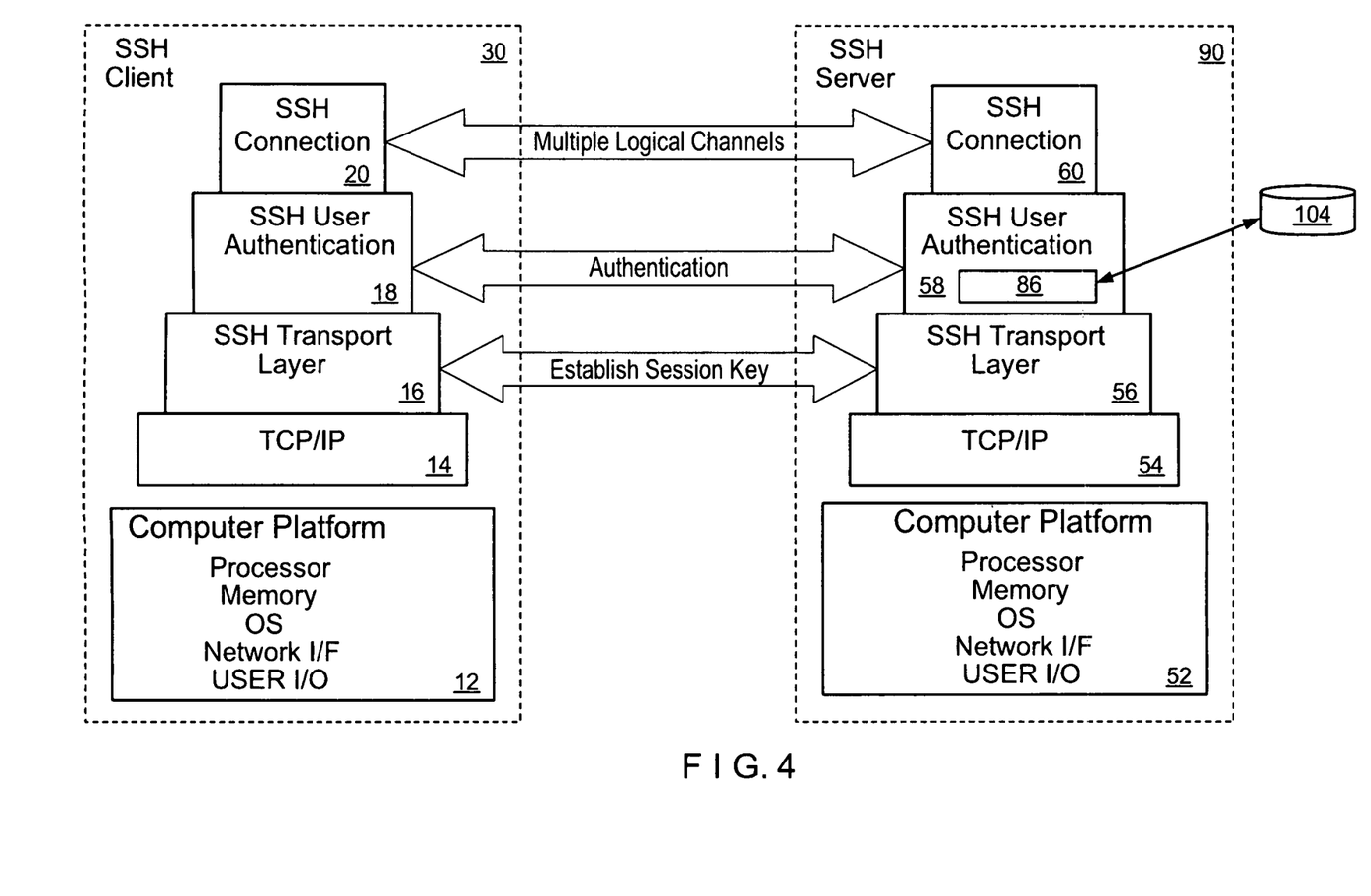
FIG. 4 is a block diagram of a portion of the OSI model depicting an SSH protocol stack according to an embodiment of the present invention

FIG. 4 depicts establishment of an SSH connection according to the present invention. The transport layer protocol operates in a typical manner, in which a session key is invoked between transport layers 16, 56 of the client computer 30 and the server 90, respectively, and the host computer is authenticated. Further details regarding the transport layer communications can be found, for instance, in Ylonen, T. and C. Lonvick, Ed., "The Secure Shell (SSH) Protocol Architecture", RFC 4251, January 2006, and Ylonen, T. and C. Lonvick, Ed., "The Secure Shell (SSH) Transport Layer Protocol", RFC 4253, January 2006, both of which are incorporated by reference herein in their entireties.

After the server machine and host computer is authenticated and encrypted communications channel is established at the transport layer, user authentication occurs at the authentication layers 18, 58 with implementation of the authentication protocol as is described in Ylonen, T. and C. Lonvick, Ed., "The Secure Shell (SSH) Authentication Protocol", RFC 4252, January 2006, which is incorporated herein by reference in its entirety. In addition, according to the present invention, account authorization occurs, for instance, also at the authentication layer 58 of the target server 90 operating the access control module 86, to authorize the account requesting establishment of an SSH session to access resources at the target server 90. The access control module 86 generally receives a request from an account at the client computer 30 to establish a protected tunnel 94 between the client computer 30 and the target server 90 to access certain resources at the target server 90 under the SSH protocol.

Authorization according to the present invention is implemented by the access control module 86 consulting the central policy database 104 to obtain account attributes, including access rules and policies. These access rules and policies govern access permissions by an account, using an account identity, to one or more individual servers from certain client computers based on the source computer identity. If the access control module 86 determines that the account has acceptable credentials to establish the requested session 94 as described herein, the encrypted tunnel is then multiplexed, i.e., multiple logical channels established, between the client connection layer 20 and the server connection layer 60. The connection protocol is described in further detail in Ylonen, T. and C. Lonvick, Ed., "The Secure Shell (SSH) Protocol Architecture", RFC 4251, January 2006, and Ylonen, T. and C. Lonvick, Ed., "The Secure Shell (SSH) Connection Protocol", RFC 4254, January 2006, both of which are incorporated by reference herein in their entireties.

Figure 5:
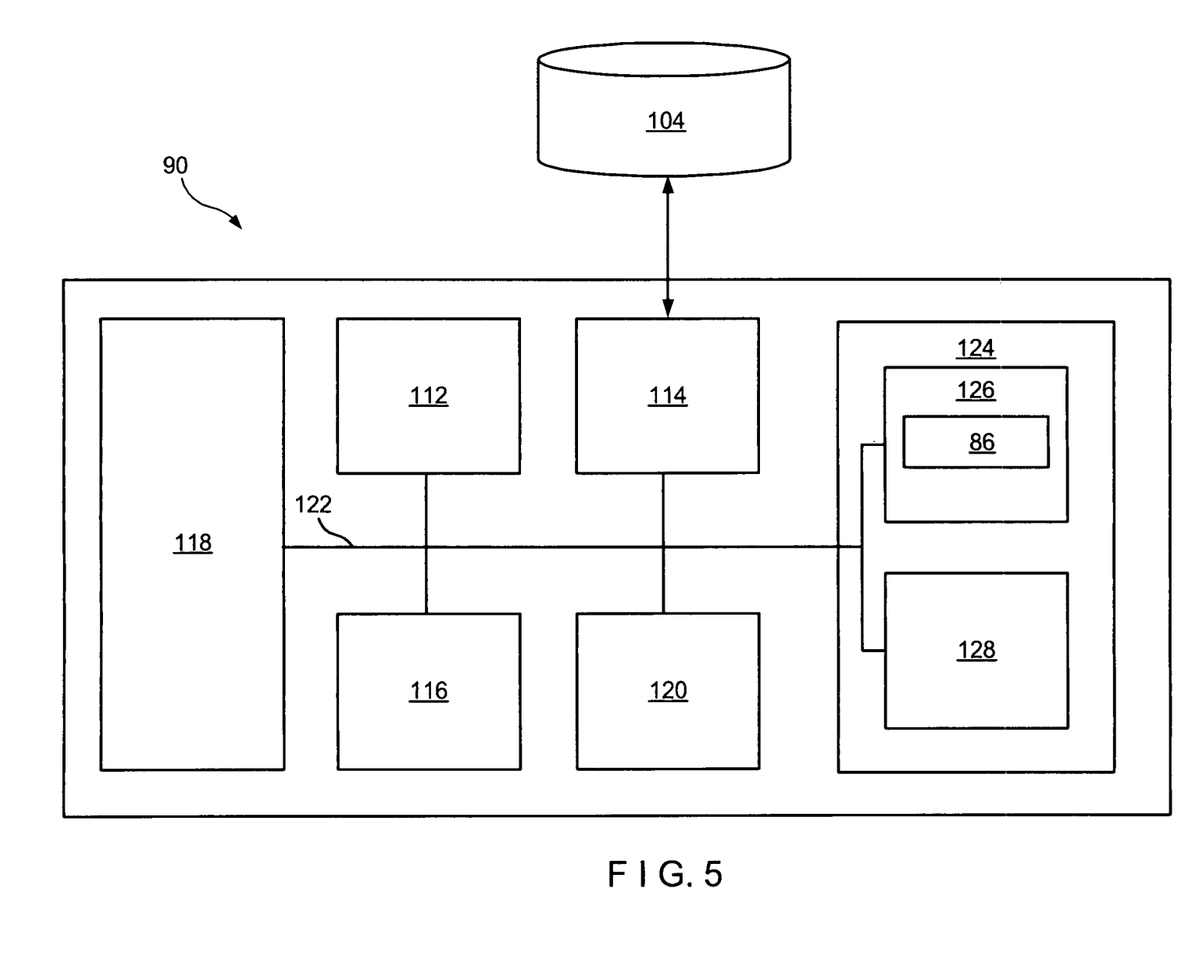
FIG. 5 is a block diagram of a SSH server computer according to an embodiment of the present invention.

An exemplary server computer 90 in which the access control module 86 of the present invention can be implemented is shown in FIG. 5. Server computer 90 includes a processor 112, such as a central processing unit, an input/output interface 114, and support circuitry 116. In certain embodiments, in which the server computer 90 requires a direct human interface, a display 118 and an input device 120 such as a keyboard, mouse or pointer are also provided. The display 118, input device 120, processor 112, input/output interface 114, and support circuitry 116 are commonly connected to a bus 122, which is also connected to a memory 124. Memory 124 includes program storage memory 126 and data storage memory 128. Note that while server computer 90 is depicted with direct human interface components display 118 and input device 120, programming of modules and display of data can alternatively be accomplished over the input/output interface 114, for instance, in which the server computer 90 is connected to a network and the programming and display operations occur on a connected computer.

Program storage memory 126 and data storage memory 128 can each comprise volatile (RAM) and non-volatile (ROM) memory units and can also comprise hard disk and backup storage capacity. Both program storage memory 126 and data storage memory 128 can be embodied in a single memory device or separated in plural memory devices. Program storage memory 126 stores software program modules and associated data, and in particular stores the software code used for the SSH protocol stack including the transport layer protocol, the authentication layer protocol including the access control module 86, and the connection layer protocol.

The server computer 90 generally supports an operating system stored in program storage memory 126 and executed by the processor 112 from volatile memory. According to an embodiment of the invention, the operating system or a separate program running under the operating system contains instructions for interfacing the device 90 to the central policy database 104 over the input/output interface 114, as more fully discussed herein. In addition, as discussed above, the SSH protocol is designed as compatible in a heterogeneous network, and accordingly the operating systems of the server computers $90_{(1)}$, $90_{(2)}$, $90_{(3)}$, $90_{(4)}$, $90_{(5)}$ ... $90_{(N)}$ can be the same or different.

It is to be appreciated by one of ordinary skill in the art that the server computer 90 can be any computer such as a personal computer, minicomputer, workstation, mainframe, a dedicated controller such as a programmable logic controller, or a combination thereof. While the server computer 90 is shown, for illustration purposes, as a single computer unit, the server computer can comprise a group/farm of computers which can be scaled depending on the processing load and repository size. It will also be understood by one of ordinary skill in the art that client computer 30 and attribute management computer 130 can have the same or similar architecture as the server computer 90.

Figure 6:
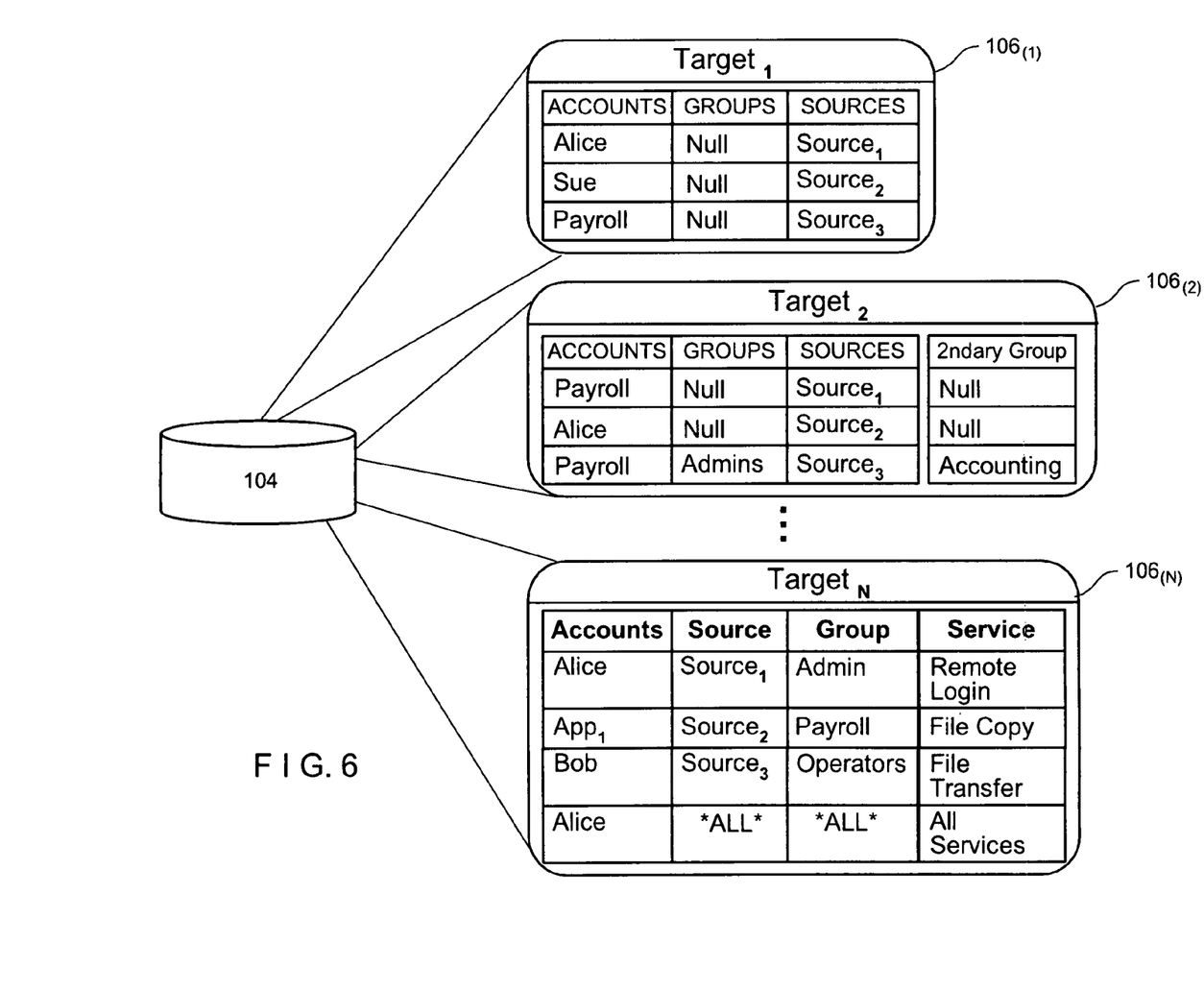
FIG. 6 depicts exemplary tables with SSH authentication policies within a central access database according to embodiments of the present invention.

FIG. 6 depicts various embodiments of sets of access rules in a central policy database 104 for servers $90_{(1)}$, $90_{(2)}$ ... $90_{(N)}$, in the form of tables $106_{(1)}$, $106_{(2)}$ ... $106_{(N)}$. While the central policy database 104 is depicted in the form of tables, i.e., part of a relational database, various types of centralized stores can be implemented to store policies, including but not limited to databases, spreadsheets, directories, flat files, and other types of repositories or data stores. The central policy database 104 includes sets of access rules with attributes including an account identity; a client computer identity, i.e., source identity; group identities, including primary groups and one or more secondary groups; service identity; and combinations comprising account identity and client computer identity, and one or more of group identity and service identity. Table $106_{(1)}$ shows attributes including account identity and client computer (i.e., source) identity. Table $106_{(2)}$ also incorporates secondary groups, whereby a user can belong to multiple groups, and membership in any one of the groups that are specified in the table will allow access to the designated server. Table $106_{(N)}$ specifies an additional attribute of the requested service, whereby an account attempting to establish an authenticated and protected tunnel over which to run an SSH service from a particular client computer is only granted permission for the designated service. The designated attribute for a particular account can be limited to one or more specific client computers and/or services, or can specify that a given account has permissions to access one or more target servers from all client computers and/or can request all SSH services.

Figure 7:
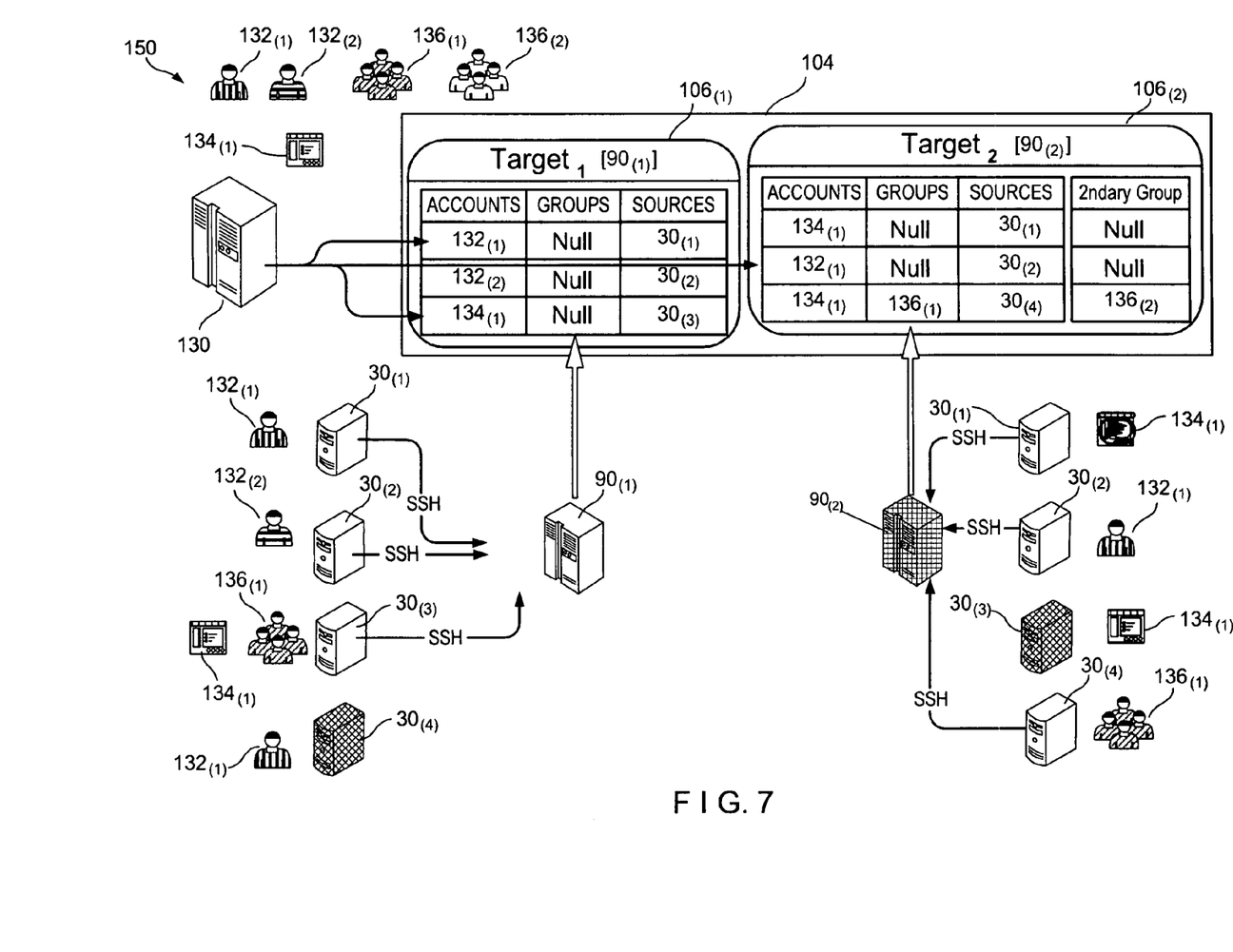
FIG. 7 depicts an overview of a system for managing access to a plurality of SSH servers in an organization according to the present invention.

Referring now to FIG. 7, a depiction of a system 150 for managing access to a plurality of servers in an organization is provided. The system 150 includes the attribute management computer 130 including the central database 104 having sets of attributes for a plurality of the target servers 90, e.g., as depicted, $90_{(1)}$ and $90_{(2)}$, in the form of tables $106_{(1)}$ and $106_{(2)}$. The tables contain attributes including identity of the accounts, which can be in the form of users $132_{(1)}$, $132_{(2)}$ ... $132_{(A)}$ and applications $134_{(1)}$ ... $134_{(B)}$. In addition, the tables contain a group identity attribute for groups or secondary groups $136_{(1)}$, $136_{(2)}$ ... $136_{(C)}$. The tables further specify a source, i.e., client computer $30_{(1)}$, $30_{(2)}$, $30_{(3)}$, $30_{(4)}$, from which the account or group can access the specified target server $90_{(1)}$ or $90_{(2)}$. In the example depicted, when user $132_{(1)}$ attempts to establish an authenticated and protected tunnel over which to run an SSH service with target server $90_{(1)}$ from client computer $30_{(1)}$, the target server $90_{(1)}$, i.e., the access control module 86 programmed therein, accesses and downloads a portion of the table $106_{(1)}$ of the central policy database 104 which corresponds to the user attempting access. Then, the access control module 86 determines whether credentials exist to allow user $132_{(1)}$ to establish an authenticated and protected tunnel with server $90_{(1)}$ from client computer $30_{(1)}$, based on the downloaded access rules.

In this example, since table $106_{(1)}$, which provides credentials for server $90_{(1)}$, lists user $132_{(1)}$ in the same row as client computer $30_{(1)}$, indicating positive credentials hence and SSH connection will be established for the requested resources. Likewise, when user $132_{(2)}$ attempts to establish an authenticated and protected tunnel over which to run an SSH service with target server $90_{(1)}$ from client computer $30_{(2)}$, the tunnel will be established because user $132_{(2)}$ is listed in table $106_{(1)}$ with positive credentials to access server $90_{(1)}$ from client computer $30_{(2)}$. In addition, an attempt to establish an authenticated and protected tunnel over which to run an SSH service with target server $90_{(1)}$ from client computer $30_{(3)}$ using the application $134_{(1)}$ will be allowed, because the account for application $134_{(1)}$ is listed in table $106_{(1)}$ with positive credentials from client computer $30_{(3)}$. Note that none of the depicted accounts, including user $132_{(1)}$, user $132_{(2)}$, and application $134_{(1)}$ are listed as having access to server $90_{(1)}$ from client computer $30_{(4)}$ in table $106_{(1)}$. Therefore, attempts by user $132_{(1)}$, user $132_{(2)}$, application $134_{(1)}$, or the group $136_{(1)}$ to establish an authenticated and protected tunnel over which to run an SSH service with server $90_{(1)}$ from client computer $30_{(4)}$ will be denied.

Likewise, referring to table $106_{(2)}$ in FIG. 7, which provides access credential attributes for target server $90_{(2)}$, an attempt to establish an authenticated and protected tunnel over which to run an SSH service with target server $90_{(2)}$ from client computer $30_{(1)}$ using the application $134_{(1)}$ will be allowed, because the account for application $134_{(1)}$ is listed in table $106_{(2)}$ with positive credentials from client computer $30_{(1)}$. If $132_{(1)}$ attempts to establish an SSH tunnel with target server $90_{(2)}$ from client computer $30_{(2)}$, the tunnel will be established because user $132_{(1)}$ is listed in table $106_{(2)}$ with positive credentials to access server $90_{(2)}$ from client computer $30_{(2)}$. When a member of group $136_{(1)}$ or secondary group $136_{(2)}$ attempts to establish an SSH tunnel with target server $90_{(2)}$ from client computer $30_{(4)}$, using the application designated account $134_{(1)}$, the tunnel will be allowed, because both group $136_{(1)}$ and secondary group $136_{(2)}$ are listed in table $106_{(2)}$ with positive credentials from client computer $30_{(4)}$. However, if user $132_{(1)}$, user $132_{(2)}$, application $134_{(1)}$, or a member of the group $136_{(1)}$ attempts to establish an authenticated and protected tunnel over which to run an SSH service with target server $90_{(2)}$ from client computer $30_{(3)}$, the requested SSH session will be denied, as none of those accounts $132_{(1)}$, $132_{(2)}$, or $134_{(1)}$, or the groups $136_{(1)}$ or $136_{(2)}$, have the requisite credentials in table $106_{(2)}$.

Figure 8:
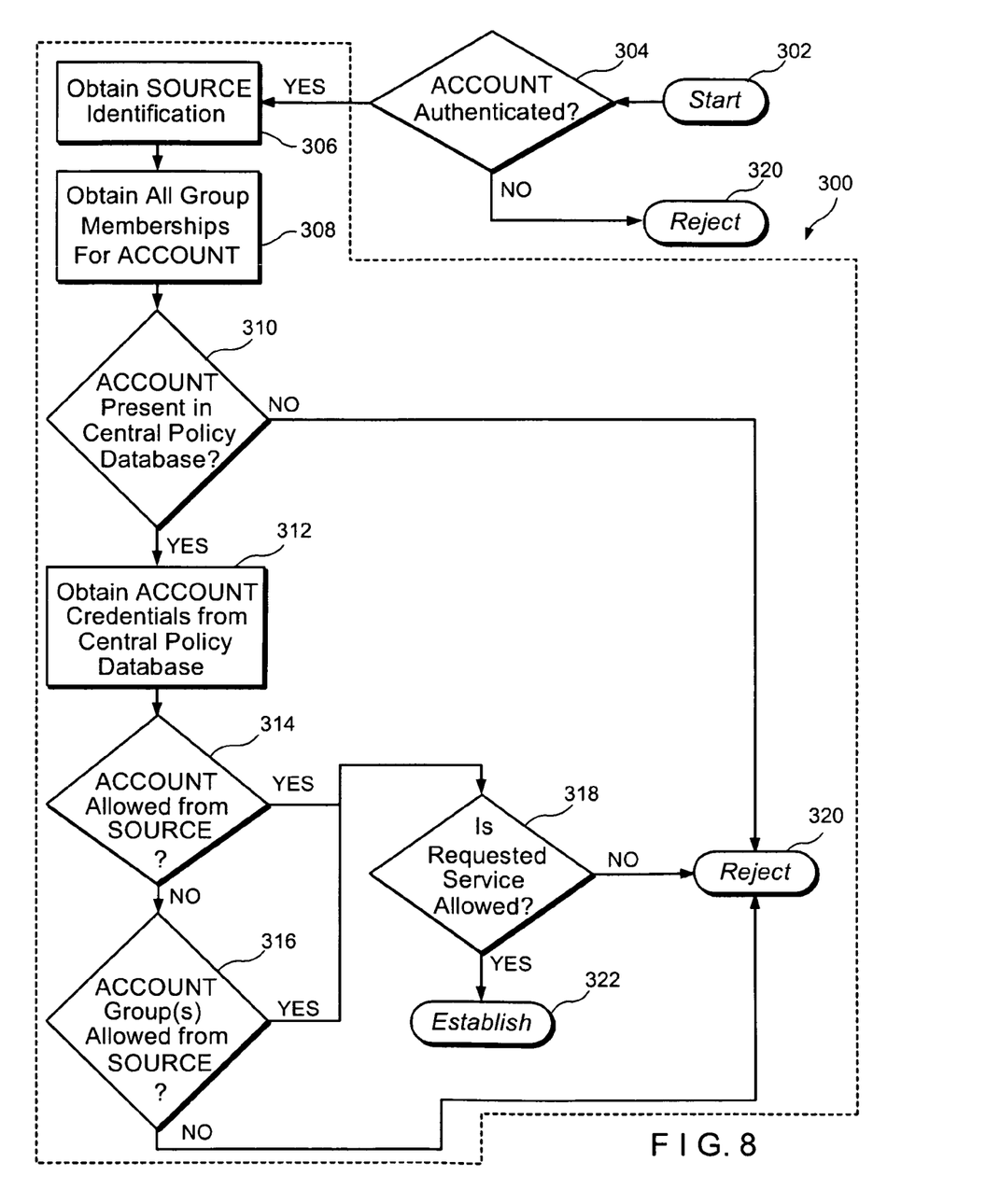
FIG. 8 is a process flow diagram of SSH account authentication on a centrally managed policy system according to the present invention.

FIG. 8 is a decision flow diagram of an account authorization process 300 according to the present invention that is implemented at the target server 90 with which an SSH session request for a particular service has been received from a particular source computer 30. The process 300 is part of the access control module 86. After the SSH session key has been established between the transport layers of the client computer and the server, which protects account information transmitted over the connection, including account names and passwords, an account authentication proceeds as provided in the SSH protocol, in which the user or application requesting the session is authenticated, as indicated by authentication step 304. If the account is not authenticated, then the establishment of the SSH session for the requested service is rejected 318.

If the account is affirmatively authenticated at the authentication step 304, the account authorization process 300 commences with a source identification step 306, in which the source, i.e., client computer, identification information is obtained. This can be accomplished using the IP address of the source computer 30 directly, or, as depicted, for instance, in FIG. 6, using a more common computer name, i.e., using a name resolution or name lookup procedure. A directory of IP addresses and associated computer names can be maintained at each server 90, or alternatively at the central policy database 104. In embodiments in which the directory of IP addresses and associated computer names is maintained at the central policy database 104, source identification step 306 includes a step of querying the central policy database 104 to determine the computer name.

Next, a group identification step 308 determines all group memberships, including primary groups and secondary groups, for the given account. Using the name of the given account, the identity of the groups to which that account belongs are obtained for use in subsequent steps of the authorization process 300. In certain embodiments, all target servers 90 include a directory of groups and associated memberships. In alternative embodiments, a directory of groups and associated memberships can be maintained at the central policy database 104, and the group identification step 308 includes a step of consulting the central policy database 104 to ascertain the group memberships for the given account name. Group members can be a plurality of various types of accounts, including users, applications, or a combination of users and applications.

The next decision step 310 determines whether the given account exists in the central policy database, by querying the central policy database 104, i.e., at the identity management computer 130. If it is determined at step 310 that there are no credentials or policies listed for the particular account, the request to establish the SSH session for the particular service is rejected 320. The authorization process 300 is exclusionary. Accordingly, even if a group is listed as having credentials for that particular target server, if the account is not specifically listed in the central policy database 104, establishment of the SSH session for the requested service will be rejected, without further consultation with the central policy database 104.

If step 310 results in an affirmative response, then access rules containing the account credentials are obtained from the central policy database 104 at step 312 obtains. As discussed above, the central policy database 104 can be in the form of one or more databases, spreadsheets, directories, flat files, or other types of repositories or data stores. Accordingly, obtaining the credentials for the particular account can be accomplished, using structured query language (SQL) retrieval, lightweight directory access protocol (LDAP) query, or other suitable process for querying data stored in the central policy database 104. Certain of these attributes for the particular account are typically downloaded from the central policy database 104 to the selected target server 90 and stored in the memory 128 for use within the remainder of the process 300.

In certain embodiments, the account attributes can be limited to the specific parameters for which the request is based, e.g., the account, the particular client computer from which access is requested, and the particular service requested. With such a fine grained query, if these specific parameters are not satisfied in the consultation with the central policy database 104, even though the account is present in the table as determined at step 310, the request to establish the SSH session for the particular service will be denied.

In some instances, it is desirable to broadly download attributes for a particular account as related to the target server and continue with the decision flow of process 300. The attributes contained in the access rules and downloaded for use in the process 300 can include the entire access rules table for the particular target server 90. Alternatively, the downloaded attributes can be specific to the account requesting access.

With a set of downloaded attributes for a particular account as related to the target server 90, the authorization process 300 proceeds to systematically compare the attributes derived from the central policy database 104 to the account request. At step 314, it is determined whether the account has permission to access the target server from the particular source, i.e., client computer. If the account requesting the SSH session for the particular service does not have the credentials to establish the connection as determined at step 314, the process 300 next determines at step 316 whether a group to which the account belongs is permitted to access the target server 90 from the source computer.

If the answer to step 314 or 316 is affirmative, the process 300 proceeds to determine whether the services designated with respect to that source match the requested service at step 318. If the services match, the requested SSH session for that particular service is established 322. If the requested service does not match a service for which the account is permitted to access from the source computer, establishment of the SSH session for the requested service is rejected 320.

If neither the account nor any of the groups to which the account belongs have policy credentials to access the target server 90 form the source, establishment of the SSH session for the requested service is rejected 320 without verification of the requested service.

Note that once an account is authorized with respect to a particular target server and requested service from a give source computer, any modifications require subsequent processing and decision flows based on process 300. For instance, if a user accesses a target server as a particular username, and subsequently requests access via an application that is designated as a separate account, the authorization process 300 is performed again using the application name as the account name. If the application name is not a valid account, establishment of the SSH session for the requested service will be denied.

In addition, if an account is authorized with respect to a given service, a request to use a different service will also require reauthorization using process 300. Likewise, if an account is authorized for a particular target server 90, a request to access SSH services at another service will require reauthorization using process 300.

As can be appreciated, using a centralized database and requiring the servers to always retrieve the latest access rules from a central database for each SSH session request from a client computer provides an important advantage in that the access rules are consistently applied regardless of when the changes are made. Since the access rules are maintained in only the central database, it is easier to manage as changes only need to be made in one place and it is easy to secure data in a single place. Moreover, since the present invention uses existing SSH protocol which is present in many operating systems, it allows client computers to access the resources of the servers regardless of the operating system running in the servers or the client computers so long as each can run the associated code for SSH protocol.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A system for managing access to a plurality of servers each executing an operating system independent Secure Shell (SSH) protocol, the system comprising:
   a central policy database in communication with the plurality of servers and centrally storing a plurality of access rules that specify access to the servers for a plurality of users using the SSH protocol;
   an access control module executable by each of the servers and adapted to:
     receive, from a client computer, a user request with an account name to establish an SSH session with a target server among the servers;
     upon receiving the user request, accessing the central policy database to retrieve the access rules for the user; and
     determine whether the user has permission to establish the SSH session with the target server based on the retrieved access rules, user identity and client computer identity;
   wherein the access rules of the central policy database specify access to the servers based on user identity, client application identity, client computer identity and server identity; and
   the access control module determines whether to establish the SSH session by comparing the user identity of the user when the user identity is being used as the account name, identity of a client application program running on the client computer when the identity of the client application program is being used as the account name, identity of the client computer and identity of the target server against the retrieved rules.

2. The system of claim 1, wherein:
   the access rules of the central policy database further specify access to the servers based on user groups to which users belong; and
   the access control module determines whether to establish the SSH session with the target server by comparing the identity of one or more user groups to which the user belongs against the retrieved rules.

3. The system of claim 1, wherein:
   the access rules of the central policy computer specify access to the servers based on user identity, client computer identity, server identity and an SSH service requested by the user; and
   the access control module determines whether to establish the SSH session by comparing the identity of the user, identity of the client computer, identity of the target server and the requested SSH service against the retrieved rules.

4. The system of claim 1, wherein the access control module is part of the SSH code being executed in the servers.

5. A system for managing access to a plurality of servers each executing an operating system independent Secure Shell (SSH) protocol by a plurality of client computers over a network, the system comprising:
   a central policy database in communication with the plurality of servers, and centrally storing a plurality of access rules that specify access to the servers for a plurality of accounts using the operating system independent SSH protocol;
   an access control module executable by each of the servers and adapted to:
     receive, from one of the client computers, a request with an account name from an account to establish an SSH session with a target server among the plurality of servers;

responsive to the received request, retrieve associated access rules from the central policy database;
determine whether the account has permission to establish the SSH session with the target server based on the identity of the one client computer; and
establish the SSH session between the target server and the one client computer if the retrieved access rules indicate that the account has permission to access the target server from the one client computer;
wherein the access rules of the central policy database specify access to the servers based on account identity, client computer identity and server identity;
the account identity being a user identity of a user when the user identity is being used as the account name, and the account identity being a client application identity when the identity of a client application program running on the one client computer is being used as the account name; and
the access control module determines the account permission to log in to the target server by comparing the identity of the account, identity of the one client computer and identity of the target server against the retrieved access rules.

6. The system of claim 5, wherein:
the access rules of the central policy database specifying access to the servers is further based on user identity, client computer identity, server identity and an SSH service requested by the user; and
the access control module determines whether to establish the SSH session by comparing the requested SSH service against the retrieved access rules.

7. The system of claim 6, wherein the requested SSH service includes a remote login service and file transfer service.

8. The system of claim 5, wherein:
the access rules of the central policy database specify access to the servers based on groups to which the accounts belong; and
the access control module determines whether to establish the SSH session with the target server by comparing the identity of the group to which the account belongs against the retrieved access rules.

9. The system of claim 5, wherein the access control module is part of the SSH code being executed in the servers.

10. A method for managing access to a plurality of servers each executing an operating system independent Secure Shell (SSH) protocol from a plurality of client computers, the method comprising:
receiving, by a target server among the plurality of servers, a request with an account name from an account of a client computer to establish an SSH session with the target server;
responsive to the received request, retrieving associated access rules from a central policy database which is in communication with the plurality of servers and which centrally stores a plurality of access rules that specify access to the servers using the SSH protocol;
determining whether the account has permission to establish the SSH session between the target server and the account of the client computer based on the retrieved access rules and the identity of the client computer; and
establishing the SSH session between the target server and the account of the client computer if it is determined that the account has permission to establish the SSH session,
wherein the access rules of the central policy database specify access to the servers based on account identity, client computer identity and server identity, and the step of determining includes determining whether the account has permission to establish the SSH session by comparing the identity of the account, identity of the client computer and identity of the target server against the retrieved access rules,
the account identity being a user identity of a user when the user identity is being used as the account name, and the account identity being a client application identity when the identity of a client application program running on the one client computer is being used as the account name.

11. The method of claim 10, wherein:
the access rules of the central policy database specifying access to the servers is further based on an SSH service requested by the user; and
the step of determining includes determining whether the account has permission to establish the SSH session by comparing the requested SSH service against the retrieved access rules.

12. The method of claim 10, wherein:
the account represents groups;
the access rules of the central policy database specify access to the servers based on groups to which the accounts belong; and
the step of determining includes determining whether the account has permission to establish the SSH session by comparing the identity of the group to which the account belongs against the retrieved access rules.

13. The method of claim 10, further comprising:
after establishing the SSH session between the target server and the client computer using the user identity as the account name:
receiving a subsequent request to access a SSH service using an application program designated as a separate account that is separate from the account that was used for establishing the SSH session; and
denying the subsequent request to access the SSH service using the application program if the application program is an invalid account.

14. The method of claim 11, wherein:
after establishing the SSH session between the target server and the account of the client computer:
receiving a subsequent request to access another SSH service in the established SSH session; and
reauthorizing the account of the client computer for access to the other SSH service.

15. The system of claim 2, wherein the target server includes a directory of groups and associated group membership, and the group membership maintained at the target server is based on combinations of user identities and client application identities.

* * * * *